May 11, 1971 — J. E. FENTON — 3,578,486
ELECTROSTATIC COATING MATERIAL RECOVERY DEVICE
Filed Oct. 9, 1967 — 2 Sheets-Sheet 1

INVENTOR
Joseph E. Fenton
BY Mason, Albright & Stansbury
ATTORNEYS

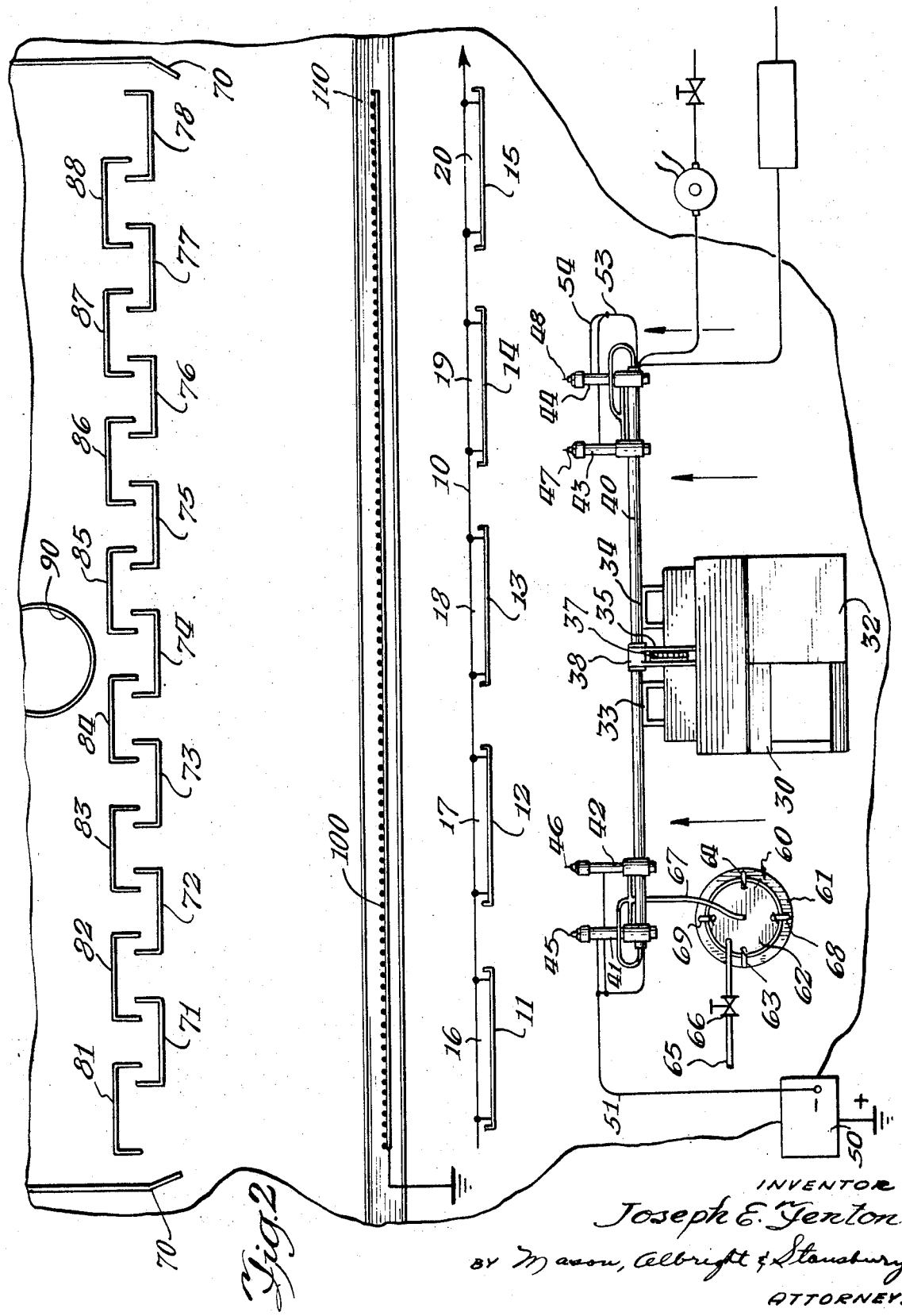

United States Patent Office 3,578,486
Patented May 11, 1971

3,578,486
ELECTROSTATIC COATING MATERIAL
RECOVERY DEVICE
Joseph E. Fenton, Grimsby, Ontario, Canada, assignor to
H. G. Fischer & Co.
Filed Oct. 9, 1967, Ser. No. 673,750
Int. Cl. B05b 5/02
U.S. Cl. 117—93.41                                          13 Claims

ABSTRACT OF THE DISCLOSURE

In electrostatic spray coating systems a barrier of electrical conductive aperture material is placed beyond the work to be coated to recover overspray. The barrier is either connected to the work to be coated so that it remains at the same potential or an auxilliary power supply is provided to increase the potential difference between a charging electrode and the barrier over the potential difference between the electrode and work being coated.

---

Figure 1:
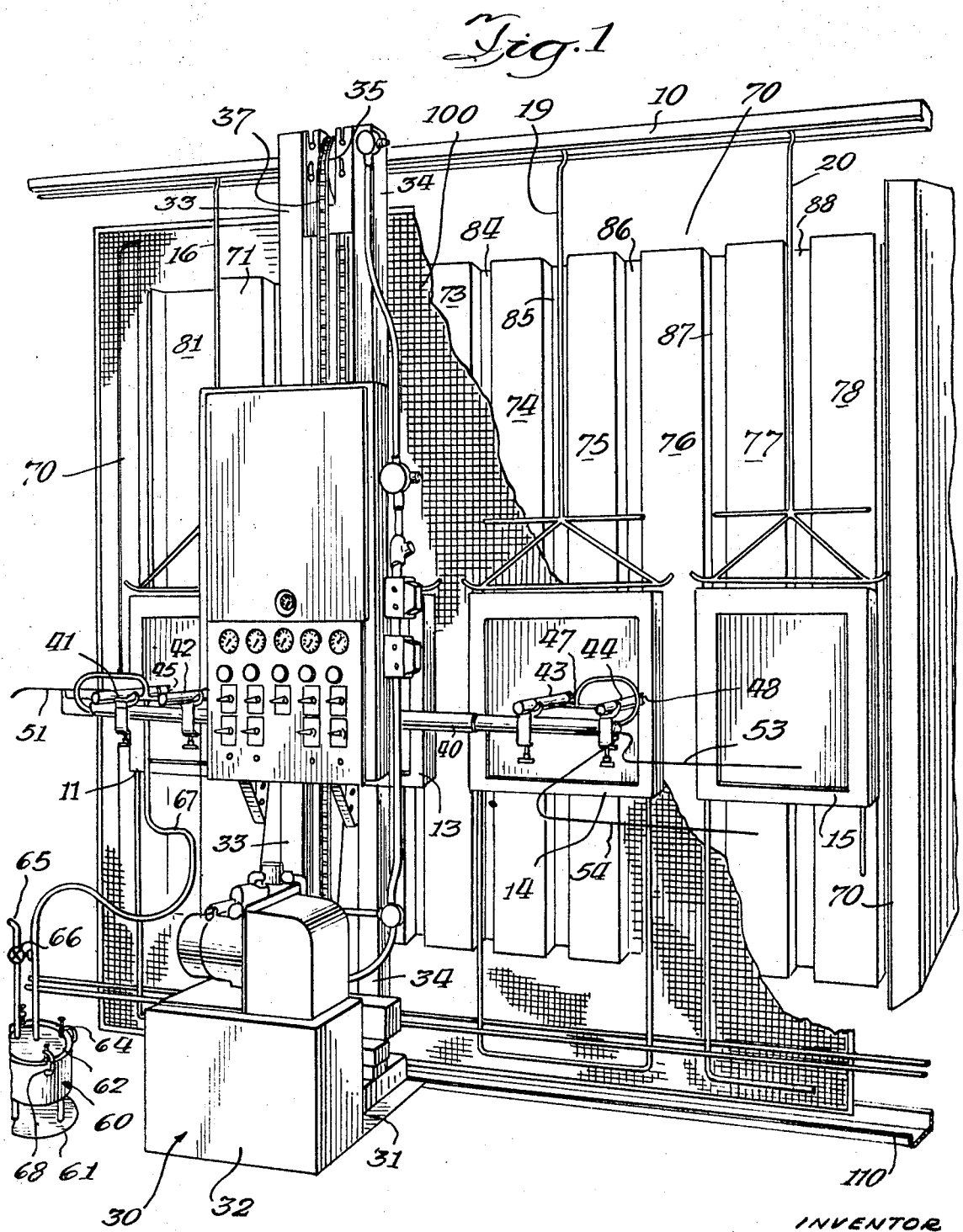

The present invention relates to apparatus and methods for recovering fluid coating materials utilized in electrostatic spray coating systems which fail deposition on work to be coated, and particularly relates to the recovery of porcelain enamel sprayed in a fluid carrier that is normally water.

Electrostatic spray coating has been improved greatly in efficiency by the system described in U.S. Pat. No. 3,251,551 issued to Arvid C. Walberg on May 17, 1966. The efficient spraying of solid granular material such as porcelain enamel has been made possible by the electrostatic system described in the co-pending application, Ser. No. 580,468 of Arvid C. Walberg, filed Sept. 17, 1966, now Pat. No. 3,463,121. However, even with the utilization of these systems, some of the coating material is not deposited on the work to be coated, but instead is lost into the atmosphere. There is particularly evident where the spray gun is not rendered inoperable between the passage of work articles on a conveyor in an automatic spraying system. If a spray booth is utilized it may be evacuated out through an exhaust fan system. If the coating material is not relatively expensive it may not be economically feasible or desirable to attempt to recover the wasted coating material, which is often referred to as "overspray." However, if the coating material is relatively expensive, such as porcelain enamel, which is usually sprayed as frit emersed in a fluid carrier, it may be desirable to attempt to recover all of the material that would otherwise be wasted, even though such overspray constitutes a relatively small percentage of the total material being sprayed. The present invention makes it possible to recover a high percentage of such overspray in a manner which will allow it to be re-sprayed with little or no further processing. This system is particularly adaptable to saving a large percentage of the overspray found in porcelain enamel spraying systems.

It is, therefore, an object of the present invention to provide a new and improved electrostatic spray coating material recovery system.

A further object is to provide a new and improved method for recovering coating material which has become overspray in the operation of an electrostatic depositing coating system.

Yet another object of the present invention is to provide a conductive aperture barrier to attract overspray in an electrostatic spray system.

An additional object is to provide a method for recovering overspray wihch includes the positioning of a conductive aperture barrier at the points of minimum velocity of atmospheric flow between work to be coated and the baffles in an electrostatic spray coating system.

Further objects and advantages will become apparent from the following detailed description taken in connection with the accompanying drawing, in which:

FIG. 1 is a perspective view of apreferred embodiment of the present invention; and FIG. 2 is a top elevational view of the preferred embodiment illustrated in FIG. 1.

While this invention is susceptible of embodiment in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring to both FIGS. 1 and 2, a conveyor 10 of any conventional design well known to those skilled in the art, carries work to be coated, such as panels 11 through 15. They are connected to the conveyor 10 by means of conductive hangers 16 through 20, respectively. The conveyor 10 is electrically connected in electrical ground and, therefore, the work to be carried by the conveyor, such as panels 11 through 15, are also connected to ground through the respective electrically conductive hangers 16 through 20 and the conveyor 10. A hydraulic reciprocator generally indicated at 30 has a base 31 upon which is mounted a hydraulic unit 32 and vertical guide rails 33 and 34. A pulley 35 and another pulley (not shown) are rotatably mounted to the guide rails 33 and 34 in the top and bottom of the rails. The pulleys have grooves shaped to receive a drive chain 37 which has its ends connected to a spray gun carriage 38. The carriage 38 has ball bearings mounted internally (not shown) which contact the respective rails 33 and 34 in order that the carriage 38 may be smoothly guided in vertical movement by the guide rails. An analogue control as is more fully described in the co-pending application of Arvid C. Walberg, Ser. No. 580,468, filed Sept. 17, 1966, is operatively connected to the chain 37 in order to reciprocate the carriage 38.

A hollow cross arm 40 in the form of a tube of electrical insulating material is rigidly secured into the spray gun carriage 38. A set of four spray guns 41–44 are clamped to the cross arm 40. Each gun has an electrode 45–48, respectively, of the general type illustrated in the aforementioned co-pending application 580,468 mounted thereon.

A high voltage power supply 50 capable of supplying voltages generally in the range of 60,000 to 150,000 volts has a positive output terminal connected to electrical ground and its negative output terminal connected to the spray guns 41–44 by high voltage electrical leads 51–54, respectively. The high voltage line 53 passes through the hollow cross arm 70 in order to reach gun 44 and the gun 43 via line 54.

A porcelain enamel pressure tank 60 is mounted on a three-leg insulator stand 61. The tank 60 has a cover 62 which makes an airtight seal for the tank 60 when screw clamps 63 and 64 are utilized to secure it. A source of air pressure (not shown) is connected to an air line 65 of electrical insulating material (such as nylon) which has a manual or remotely operated air regulator 66 placed therein. The air line 65 is connected to the tank cover 62 to supply air at control pressure to the interior of the tank. A fluid hose 67 of electrical insulating material (such as nylon) extends through the cover 62 downward into the tank 60 and is connected to each of the guns 41–44 to supply coating material thereto.

The guns 41–44 may be of either the air atomizing or the hydrostatic atomizing type. When air atomizing guns are utilized they may have a source of heated air pressure connected thereto as is more fully described in the copending application of Arvid C. Walberg, Ser. No. 580,468.

An enclosure for receiving overspray 70 has an inner surface composed of a set of baffles 71–78. These baffles are U-shaped in horizontal cross-sections as illustrated in FIG. 2. As is further illustrated in FIG. 2, a second set of baffles 81–88 which are also U-shaped in cross section are positioned so that a flow of air must make two 180 degree turns to pass beyond the two sets of baffles. The enclosure 70 behind the baffles has an exhaust opening 90 to which an exhaust fan (not shown) is connected to draw air through the sets of baffles 71–78 and 81–88 and out through the exhaust aperture 90. This baffle system is conventional in automatic spraying systems and many manual spraying systems and is utilized to provide a uniform velocity air flow of air from the work to be coated into the enclosure. A manual spraying system may not utilize such a system for carrying away overspray and other materials.

In the preferred embodiment illustrated in the figures an aperture barrier 100 consisting of a grid or screen composed of conductive metal is positioned between the work to be coated, panels 11–15, and the baffles 71–78 forming the inner surface of enclosure 70. The grid 100 is connected to ground. Thus in the embodiment of the invention illustrated in the figures the work to be coated and the barrer grid 100 are at ground potential and, therefore, the same differential of potential exists between the electrodes 45–48 mounted in the guns and the grounded barrier grid 100 as exists between the electrodes and the work to be coated. In the porcelain enamel spraying system illustrated in the drawings, the grid 100 is placed approximately 12 inches from the line of panels 11–15 and between two and three feet from the inner surface of the baffles 71–78. The electrodes 45–48 mounted on the spray guns are spaced approximately 12 inches from the line of panels 11–15 as they move along the conveyor 10. With such an arrangement there would be an air movement by the guns 41–44, as they are operating to spray the panels, of approximately 100 feet per minute. The velocity of the air will slow down after passing the row of panels 11–15. However, the velocity of the air will increase again to a maximum of the order of 1000 feet per minute as it passes through the restricted spaces between the rows of baffles. Therefore, the atmosphere movement after passing the panels is such that it reaches a minimum velocity approximately 12 inches beyond the panels as it reaches the grounded barrier grid 100. Thus the overspray that occurs particularly as the guns spray between the panels is moving more slowly as it approaches the grounded barrier grid 100. The ratio of aperture area to grid area is preferably several times greater than the baffle aperture area to baffle area. Thus, although the velocity of the atmosphere passing through the grid 100 is increased because of the somewhat more restricted cross-sectional unit area that it must pass through, the maximum velocity of the atmosphere is only relatively slightly increased. Since the overspray porcelain enamel particles are charged negatively to the charge on the grid 100, they will be attracted to the grid 100 and deposit themselves thereon.

A trough 110 is provided under the barrier grid 100 to catch the particles when they fall from the grid. When the porcelain enamel particles have collected on the grid to a reasonable thickness, the grid is shaken to knock the particles downward into the trough 110. The trough is periodically emptied of the porcelain enamel contained therein which is returned to be utilized again as spraying material. By the use of the system illustrated in the drawings, over 90 percent of the porcelain enamel sprayed thereby has been applied to the work to be coated and/or recovered by the barrier grid 100.

When an enclosure 70 having a baffle or other type of apertured surface through which air is drawn from the normal overspray area is not utilized, the barrier 100 is placed at a distance behind the work to be coated at which the air movement is still reasonably uniform but has reached almost a zero velocity and is becoming variable in its direction of movement. With the use of manual guns, this location will vary, but a mean position may be found for the grid.

Those skilled in the art will recognize that the present invention may take many forms. All such modifications are intended to be within the scope of the appended claims. For example, the grid 100 may be replaced with a baffle system similar to that utilized in enclosure 70 or may take the form of other baffle systems. These will work quite effectively as long as the velocity of the air passing through such barrier is not greatly increased. Thus, if the barrier 100 is in the form of a baffle system and the enclosure being utilized to exhaust the overspray area has also a baffle system as illustrated in the drawings, the aperture area to area of the barrier should be suitably greater than the aperture area to area of the enclosure baffle structure. Further, other types of barriers such as a series of rods, fine screening and multiply grids placed in series may be utilized depending upon the fluid being coated. While the invention as particularly suitable to the recovery of porcelain enamel which is a powderized solid of reasonably fine grid size emersed in a fluid carrier, preferably water, it is equally applicable to the recovery of any other type of coating material where the material is sufficiently expensive to make recovery of overspray desirable.

Another modification of the invention is to provide means for moving the barrier 100 to various positions between the work to be coated on the conveyor 10 and the baffles 71–78 in order that when the form of work to be coated carried by the conveyor 10 is changed, the barrier may be easily re-positioned for optimum performance. Different types of work to be coated carried by the conveyor have different effects upon overspray, especially that occuring between the pieces of work. The position at which the overspray may reach a minimum velocity may change substantially when the type of work on the conveyor is changed.

Yet another modification of the present invention would be to employ a second source of high potential which would be connected between the barrier 100 and circuit ground to increase the difference of potential between the electrodes 45–48 in the guns 41–44, respectively, to the barrier over that between the electrodes and the work to be coated. Applying this modification to the system illustrated in the drawings, the output of such a power supply could be varied to make the grid more positive than the work on the conveyor 10. Those skilled in the art are aware that it is common practice at the present time to connect work to be coated to ground and also to connect the positive terminal of a power supply to ground making the electrodes in the guns have a relative negative potential of the order of 60 to 150 kilovolts. However, the system could operate by reversing the polarity of both the charging power supply and the barrier power supply. By making the barrier more negative or more positive, depending upon the connections of the charging power supply, the attraction of the barrier for overspray particles may be increased. Thus, overspray particles which might not have been sufficiently charged by the electrodes and, therefore, become part of the overspray will be more highly attracted to the barrier 100. In such an installation, it is preferable to have the output of the barrier power supply variable in order to make it possible for an operator to attempt to obtain an optimum recovery of the material being sprayed.

I claim:

1. In a electrostatic coating system comprising having:
a spray gun, an electrode mounted at said spray gun for charging atomized particles ejected by the spray gun, a source of high potential connected between said electrode and work to be coated, means for transporting work along a given path, means for producing a uniform flow of air from said spray gun across and past the path of the work to be coated, and a source of coating material connected to said spray gun, wherein the improvement comprising:

an electrical conductive aperture means of spaced members positioned beyond the work to be coated from the spray gun, and means for maintaining a difference in potential between the electrode and said conductive aperture means which is at least equal to the difference in potential between said electrode and the work to be coated.

2. An electrostatic coating system in accordance with claim 1, wherein said conductive aperture means is a grid.

3. An electrostatic coating system in accordance with claim 1, wherein said conductive aperture means is a set of baffles.

4. An electrostatic coating system in accordance with claim 1, wherein said conductive aperture means is movably mounted for positioning relative to the work to be coated.

5. An electrostatic coating system in accordance with claim 1, wherein said means for maintaining a difference in potential between said electrode and said conductive aperture means is an electrical connection between the apertured conductive means and the work to be coated.

6. An electrostatic coating system in accordance with claim 1 wherein said means for maintaining a difference in potential between said electrode and said conductive aperture means is another source of potential connected between said conductive aperture means and the work to be coated.

7. An electrostatic coating system comprising:

a spray gun, an electrode mounted at said spray gun for charging atomized particles ejected by the spray gun, a source of high potential connected between said electrode and work to be coated, means for transporting work along a given path, a source of coating material connected to said spray gun, an enclosure positioned to receive coating particles which, after being ejected and atomized by said spray gun, fail deposition on the work to be coated, electrical conductive aperture means positioned between the work to be coated and said enclosure, means operatively connected to said enclosure for producing a uniform flow of air across the path of the work to be coated through said electrical conductive operative means, and means for maintaining a difference in potential between the electrode and said conductive apertured means which is at least equal to the difference in potential between said electrode and the work to be coated.

8. An electrostatic coating system in accordance with claim 7, wherein said enclosure includes a set of uniform baffles and a fan positioned to produce a uniform flow of atmosphere from within the enclosure through the baffles, said flow increasing in velocity as it moves towards said baffles.

9. An electrostatic coating system in accordance with claim 7, wherein:

said enclosure includes a set of uniform baffles and a fan used to produce a uniform flow of atmosphere from within the enclosure through the baffles, said flow increasing in velocity as it moves towards said baffles, said conductive apertured means is a grid, and said means for maintaining a difference in potential between said electrode and said conductive aperture means is an electrical connection between the aperture conductive means and the work to be coated.

10. An electrostatic coating system in accordance with claim 9, wherein said conductive aperture means is movably mounted for positioning relative to the work to be coated.

11. A method of recovering coating material which fails deposition on work to be coated when sprayed in an electrostatic coating system including a spray gun for atomizing coating material, an electrode associated with the spray gun to charge the atomized particles and an enclosure normally receiving the particles which fail deposition on the work to be coating comprising transporting work to be coated along a path past the spray gun, producing a uniform flow of air across and past the path of the work to be coated, placing a conductive apertured barrier between the path of the work to be coated and the inner surface of said enclosure and adjusting the potential difference between the electrode and the conductive apertured barrer to be at least equal to the difference in potential between the electrode and the work to be coated.

12. A method of recovering coating material which fails deposition on work to be coated when sprayed in an electrostatic coating system in accordance with claim 12 which includes an additional step of positioning the barrier between the work to be coated and said enclosure at a position substantially corresponding to the minimum velocity of atmospheric flow between the work to be coated and the inner surface of the enclosure.

13. A method of recovering coating material which fails deposition on work to be coated when sprayed in an electrostatic coating system including a spray gun for atomizing coating material and an electrode associated with the spray gun to charge the atomized particles comprising transporting work to be coated along a path past the spray gun, producing a uniform flow of air across and past the path of the work to be coated, placing a conductive aperture barrier beyond the work to be coated from the spray gun and adjusting the potential difference between the electrode and the conductive aperture barrier to be at least equal to the difference in potential between the electrode and the work to be coated.

References Cited

UNITED STATES PATENTS

| | | | |
|---|---|---|---|
| 2,446,953 | 8/1948 | Ransburg | 117—93.41X |
| 2,509,276 | 5/1950 | Ransburg et al. | 118—628 |
| 2,559,225 | 7/1951 | Ransburg | 117—93.42 |
| 3,336,903 | 8/1967 | Point | 118—624 |

FOREIGN PATENTS

| | | | |
|---|---|---|---|
| 205,557 | 2/1956 | Australia | 117—93.44 |

ALFRED L. LEAVITT, Primary Examiner

J. H. NEWSOME, Assistant Examiner

U.S. Cl. X.R.

117—102; 118—628, 630